(12) United States Patent
Moon et al.

(10) Patent No.: US 10,249,394 B2
(45) Date of Patent: Apr. 2, 2019

(54) PASSIVE NITROGEN INJECTING DEVICE FOR NUCLEAR REACTOR COOLANT PUMP

(71) Applicant: KOREA HYDRO & NUCLEAR POWER CO., LTD., Gyeongju-si (KR)

(72) Inventors: Ho Rim Moon, Daejeon (KR); Sang Hee Kang, Daejeon (KR); Young Sheop Park, Daejeon (KR); Han Gon Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 91 days.

(21) Appl. No.: 15/308,260

(22) PCT Filed: Jul. 22, 2014

(86) PCT No.: PCT/KR2014/006632
§ 371 (c)(1),
(2) Date: Nov. 1, 2016

(87) PCT Pub. No.: WO2015/174577
PCT Pub. Date: Nov. 19, 2015

(65) Prior Publication Data
US 2017/0062082 A1 Mar. 2, 2017

(30) Foreign Application Priority Data
May 14, 2014 (KR) .................. 10-2014-0057979

(51) Int. Cl.
*G21C 15/18* (2006.01)
*G21C 9/00* (2006.01)
(Continued)

(52) U.S. Cl.
CPC ............ *G21C 15/18* (2013.01); *G21C 9/00* (2013.01); *G21C 17/02* (2013.01); *G21C 17/028* (2013.01);
(Continued)

(58) Field of Classification Search
CPC ...... G21C 15/18; G21C 17/02; G21C 17/028; G21C 9/00; F16K 17/003; F16K 17/048; F16K 17/19
See application file for complete search history.

(56) References Cited

U.S. PATENT DOCUMENTS

2007/0221271 A1* 9/2007 Sasaki ............... H01L 21/67023
137/7
2007/0297554 A1* 12/2007 Lavie ....................... G21G 1/10
376/190
(Continued)

FOREIGN PATENT DOCUMENTS

JP 5-172979 A 7/1993
JP 2011-527405 A 10/2011
(Continued)

OTHER PUBLICATIONS

International Search Report dated Jan. 28, 2015, issued to International Application No. PCT/KR2014/006632.

*Primary Examiner* — Lily C Garner
(74) *Attorney, Agent, or Firm* — Stein IP, LLC

(57) ABSTRACT

The present invention relates to a passive nitrogen injecting device for a nuclear reactor coolant pump, the device comprising: a nitrogen supply unit for supplying nitrogen; a pressure control valve for controlling the supply of nitrogen from the nitrogen supply unit according to pressure; an accumulator for filling the nitrogen supplied through the pressure control valve at a set pressure, and supplying the filled nitrogen in the event that an accident involving coolant loss occurs; and an isolation valve for controlling the supply of the nitrogen from the accumulator into a seal housing of a nuclear reactor coolant pump. The present invention uses an accumulator so as to be able to supply nitrogen by using the pressure in the accumulator without the supply of external power in the event of an accident involving coolant (Continued)

loss, and therefore has the effect of being able to improve safety.

2 Claims, 2 Drawing Sheets

(51) Int. Cl.
*G21C 17/02* (2006.01)
*G21C 17/028* (2006.01)
*F16K 17/19* (2006.01)
*F16K 17/00* (2006.01)

(52) U.S. Cl.
CPC ............ *F16K 17/003* (2013.01); *F16K 17/19* (2013.01); *G21Y 2002/207* (2013.01); *G21Y 2002/50* (2013.01); *Y02E 30/40* (2013.01)

(56) References Cited

U.S. PATENT DOCUMENTS

| | | | |
|---|---|---|---|
| 2012/0263268 A1 | 10/2012 | Kwon et al. | 376/282 |
| 2014/0016734 A1 | 1/2014 | Moon et al. | 376/282 |

FOREIGN PATENT DOCUMENTS

| | | | | |
|---|---|---|---|---|
| KR | 10-2013-0104336 A | 9/2013 | | |
| KR | 10-2014-0018670 A | 2/2014 | | |
| KR | 20140018670 A | * 2/2014 | ............ | G21C 15/18 |
| WO | WO 2013/184207 A2 | 12/2013 | | |

* cited by examiner

[Fig. 1]
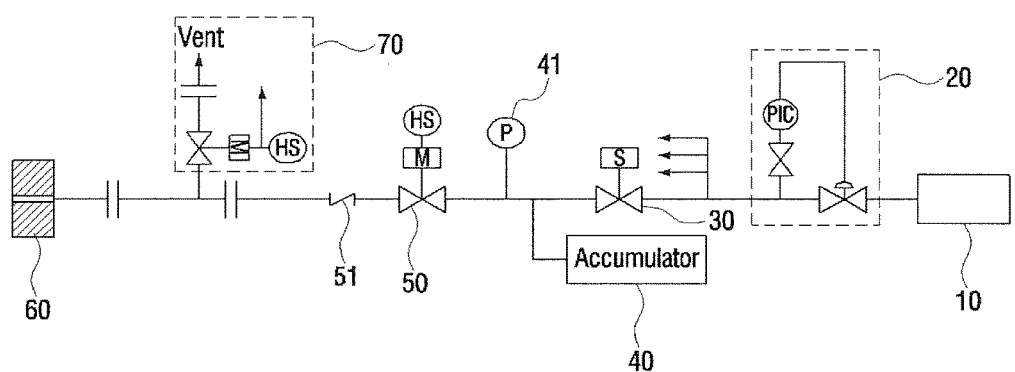

[Fig. 2]
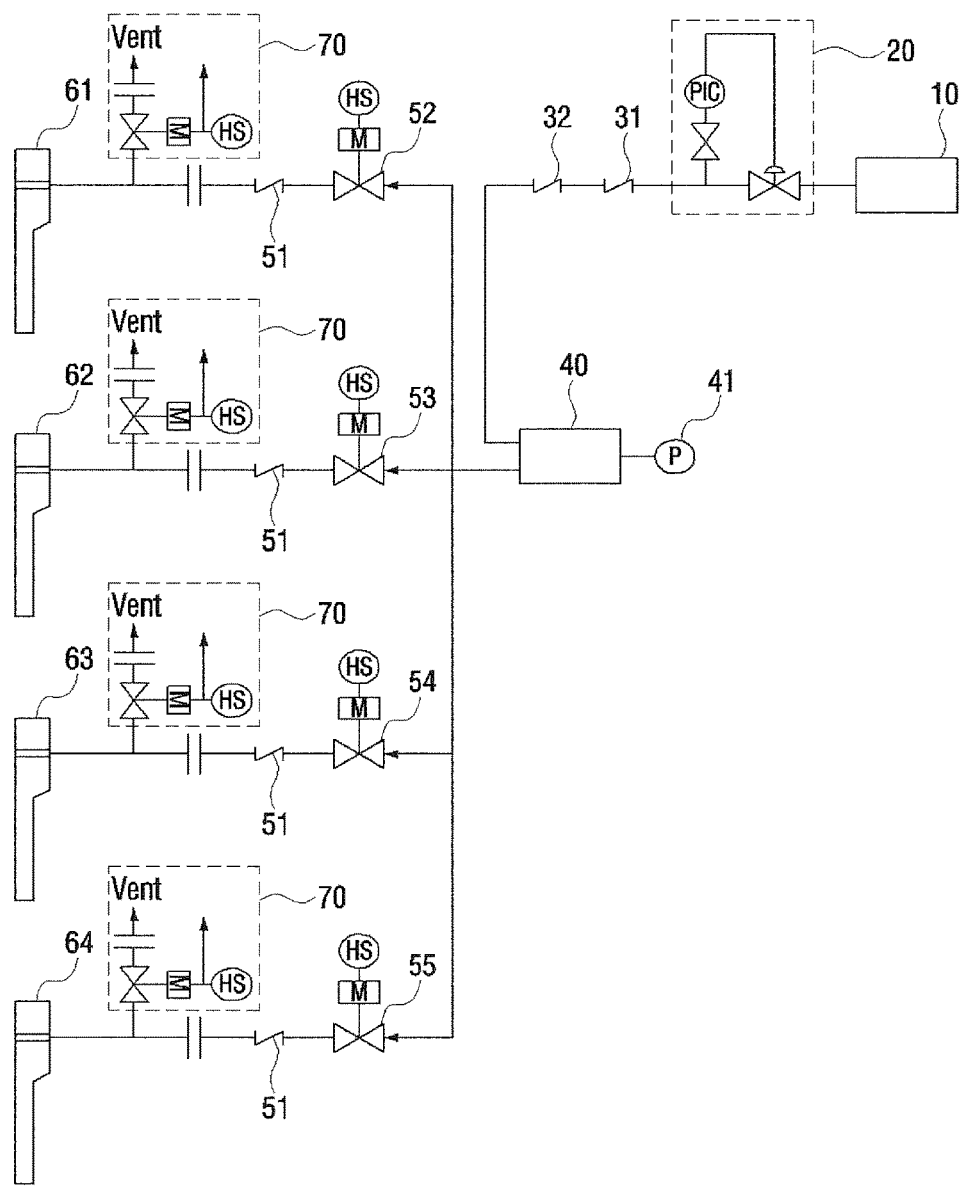

PASSIVE NITROGEN INJECTING DEVICE FOR NUCLEAR REACTOR COOLANT PUMP

CROSS-REFERENCE TO RELATED APPLICATIONS

This application is national stage of International Application No. PCT/KR2014/006632, filed Jul. 22, 2014, which claims the benefit of priority to Korean Application No. 10-2014-0057979, filed May 14, 2014, in the Korean Intellectual Property Office, the disclosures of which are incorporated herein in their entireties by reference.

TECHNICAL FIELD

The present invention relates to a passive nitrogen injection device for a domestically manufactured nuclear reactor coolant pump, and more particularly, to a passive nitrogen injection device for a nuclear reactor coolant pump capable of smoothly injecting nitrogen using an accumulator even when power is not supplied.

BACKGROUND ART

A domestically manufactured nuclear reactor coolant pump (hereinafter, nuclear reactor coolant pump) includes a standstill seal device in addition to a general three-stage seal of the nuclear reactor coolant pump to prevent a coolant from leaking when a loss-of-coolant accident (LOCA) occurs in a nuclear power plant. The standstill seal is a device positioned above the three-stage seal and configured to prevent the coolant from leaking using a pressure generated by supplying nitrogen to inside of a seal housing, but a power source is surely needed for supplying the nitrogen.

This is because a nitrogen injection system is currently classified as a non-safety system, and when an accident in which power is not supplied, e.g., loss-of-offsite-power (LOOP) and station blackout (SBO), occurs, coolant leak prevention by injecting the nitrogen may not actually be possible.

In Japanese Laid-open Patent Application No. 1996-334586 (NUCLEAR REACTOR DEVICE AND OPERATING METHOD OF SAME), although a gas reaction suppressor, which receives an accident occurrence signal and injects nitrogen for suppressing reaction between hydrogen and oxygen generated when such an accident occurs at a nuclear reactor, is disclosed, a nitrogen injection system is classified as the non-safety system as described above. Accordingly, the above-described device uses a method of supplying nitrogen using power, and there is a problem in that the nitrogen may not be supplied when the power is not supplied.

DISCLOSURE

Technical Problem

The present invention is directed to providing a passive nitrogen injection device for a nuclear reactor coolant pump capable of injecting nitrogen using a pressure, even when several accidents occur in which power is not supplied from inside or outside of a station as well as a reactor coolant pump seal loss-of-coolant accident (RCP Seal LOCA) occurring.

Technical Solution

One aspect of the present invention provides a passive nitrogen injection device for a nuclear reactor coolant pump, which relates to a passive nitrogen injection device for a nuclear reactor coolant pump, including a nitrogen supply unit configured to supply nitrogen, a pressure control valve configured to control supply of the nitrogen of the nitrogen supply unit according to a pressure, an accumulator filled with the nitrogen supplied through the pressure control valve at a preset pressure and configured to supply the filled nitrogen when a loss-of-coolant accident occurs, and an isolation valve configured to control supply of the nitrogen of the accumulator to inside of a seal housing of a nuclear reactor coolant pump.

[Advantageous Effects]

A passive nitrogen injection device for a nuclear reactor coolant pump according to the present invention has an effect in which safety is further improved by using an accumulator to supply nitrogen without supplied power and using pressure of the accumulator, when a reactor coolant pump seal loss-of-coolant accident (RCP seal LOCA) occurs.

In addition, even when a defense-in-depth accident and multiple accidents occur, loss-of-coolant can be prevented, and thus there is an effect in which safety and reliability can be improved.

DESCRIPTION OF DRAWINGS

FIG. 1 is a block diagram of a passive nitrogen injection device for a nuclear reactor coolant pump according to an exemplary embodiment of the present invention.

FIG. 2 is a block diagram of a passive nitrogen injection device for a nuclear reactor coolant pump according to another embodiment of the present invention.

REFERENCE NUMERALS

10: NITROGEN SUPPLY UNIT
20: PRESSURE CONTROL VALVE
30: ELECTRONIC CONTROL VALVE
31, 32, 51: CHECK VALVE
40: ACCUMULATOR
41: PRESSURE GAUGE
50, 52~55: ISOLATION VALVE
60, 61~64: SEAL HOUSING
70: EXHAUST

MODES OF INVENTION

Hereinafter, a passive nitrogen injection device for a nuclear reactor coolant pump will be described in detail with reference to the accompanying drawings.

FIG. 1 is a block diagram of a passive nitrogen injection device for a nuclear reactor coolant pump according to an exemplary embodiment of the present invention.

Referring to FIG. 1, the passive nitrogen injection device for a nuclear reactor coolant pump according to the exemplary embodiment of the present invention includes a pressure control valve 20 configured to supply nitrogen of a nitrogen supply unit 10 according to a pressure of nitrogen, an electronic control valve 30 configured to selectively supply the nitrogen supplied through the pressure control valve 20, an accumulator 40 filled with the nitrogen supplied through the electronic control valve 30 at a predetermined pressure, a pressure gauge 41 configured to detect a pressure of the accumulator 40, an isolation valve 50 configured to control the nitrogen supplied by the pressure of the accumulator 40 to supply the nitrogen to inside of a seal housing 60 of a nuclear reactor coolant pump, a check valve 51 configured to prevent a backflow of the nitrogen supplied through the isolation valve 50, and an exhaust 70 positioned between the check valve 51 and the seal housing 60 and configured to discharge the nitrogen to the outside.

Hereinafter, a structure and a function of the passive nitrogen injection device for a nuclear reactor coolant pump according to the exemplary embodiment of the present invention configured as described above will be described in more detail.

First, when the nuclear reactor operates normally, a pressure of the accumulator 40, which is a pressure of the pressure gauge 41, is detected. When the pressure of the accumulator 40 is a set pressure or less, pressure of nitrogen filled in the accumulator 40 is maintained at the set pressure by opening the pressure control valve 20 and the electronic control valve 30 and filling the accumulator 40 with nitrogen supplied from the nitrogen supply unit 10.

In the exemplary embodiment of the present invention illustrated in FIG. 1, one accumulator 40 for each nuclear reactor coolant pump is used as an example, and a capacity of the accumulator 40 is preferably 15 L.

A pressure of nitrogen filled in the accumulator 40 has to be greater than a pressure in the seal housing 60 when a loss-of-coolant accident (LOCA) occurs, and the maximum pressure is within an allowable pressure of the accumulator 40.

In the above state, when an LOCA of the nuclear reactor occurs and external power is not supplied, nitrogen filled in the accumulator 40 is supplied to inside of the seal housing 60 by the pressure of the accumulator 40 itself, through the isolation valve 50 and the check valve 51, due to the isolation valve 50 being opened while the electronic control valve 30 is closed.

That is, the passive nitrogen injection device for a nuclear reactor coolant pump according to the exemplary embodiment of the present invention may inject nitrogen into the nuclear reactor coolant pump when an LOCA occurs, even when power is not supplied from the outside.

FIG. 2 is a block diagram of a passive nitrogen injection device for a nuclear reactor coolant pump according to another embodiment of the present invention.

Referring to FIG. 2, the passive nitrogen injection device for a nuclear reactor coolant pump according to another embodiment of the present invention includes a pressure control valve 20 configured to supply nitrogen of a nitrogen supply unit 10 according to a pressure, check valves 31 and 32 configured to prevent a backflow of the nitrogen supplied through the pressure control valve 20, an accumulator 40 filled with the nitrogen supplied through the pressure control valve 20 at a predetermined pressure, a pressure gauge 41 configured to detect a pressure of the accumulator 40, a plurality of isolation valves 52 to 55 configured to supply the nitrogen supplied by the pressure of the accumulator 40 to insides of seal housings 61 to 64 respectively provided at a plurality of nuclear reactor coolant pumps, a plurality of check valves 51 configured to prevent a backflow of the nitrogen supplied through the isolation valves 52 to 55, and an exhaust 70 positioned between the check valve 51 and the plurality of seal housings 61 to 64 and configured to discharge the nitrogen to the outside.

Hereinafter, a structure and a function of the passive nitrogen injection device for a nuclear reactor coolant pump according to another exemplary embodiment of the present invention configured as described above will be described in more detail.

First, in another embodiment of the present invention illustrated in FIG. 2, nitrogen may be injected into a plurality of nuclear reactor coolant pumps using a single accumulator 40 while power is not supplied.

The accumulator 40 having a capacity of 50 to 60 L may be used in the above case, and when a nuclear reactor operates normally, the accumulator 40 is filled with nitrogen supplied from the nitrogen supply unit 10 through the pressure control valve 20.

Because the pressure gauge 41 is included in the accumulator 40, a pressure of the accumulator 40 may be detected. A pressure of accumulator 40 detected by the pressure gauge 41 has to be greater than internal pressures of the seal housings 61 to 64 when an LOCA occurs and less than or equal to an allowable pressure of the accumulator 40 whose capacity is in the range of 50 to 60 L.

That is, the accumulator 40 is filled with nitrogen of the nitrogen supply unit 10 through the pressure control valve 20 such that a pressure of the pressure gauge 41 which detects a pressure of the accumulator 40 becomes a predetermined value, and when the filling is completed, the pressure control valve 20 is closed such that the nitrogen of the nitrogen supply unit 10 is not supplied any more.

Next, the nitrogen filled in the accumulator 40 may be selectively supplied to each of the nuclear reactor coolant pumps when an LOCA occurs.

That is, when the seal housing 61 and the seal housing 62 need to receive nitrogen, the isolation valve 52 and the isolation valve 53 are opened and the isolation valves 54 and 55 are closed. Through the above-described control, the nitrogen filled in the accumulator 40 is supplied to inside of the seal housing 61 through the isolation valve 52 and supplied to inside of the seal housing 62 through the isolation valve 53.

As described above, in the present invention, the accumulator 40 may be individually added to each of the nuclear reactor coolant pumps, and nitrogen may also be injected into all nuclear reactor coolant pumps using one accumulator 40.

Because the nitrogen injection can also be performed in a station blackout state in which power is not supplied as described above, reliability and safety of the device may be further improved.

While the present invention was described in detail with reference to exemplary embodiments as above, the present invention is not limited to the above-described embodiments, may be variously changed within the range of claims, the mode of invention, and the accompanying drawings, and such changes also within the present invention.

INDUSTRIAL APPLICABILITY

In the present invention, nitrogen can be injected using an accumulator even when power is not supplied, and from the viewpoint of obtaining safety in a nuclear power plant management, the invention has industrial applicability.

The invention claimed is:

1. A passive nitrogen injection device for a nuclear reactor coolant pump, comprising:
    a nitrogen supply unit configured to supply nitrogen;
    a pressure control valve configured to control supply of the nitrogen of the nitrogen supply unit according to a pressure;
    an electronic control valve configured to selectively supply the nitrogen supplied through the pressure control valve;
    an accumulator filled with the nitrogen supplied through the pressure control valve at a preset pressure and configured to supply the filled nitrogen when a loss-of-coolant accident occurs;

an isolation valve configured to control supply of the nitrogen of the accumulator to inside of a seal housing of a nuclear reactor coolant pump; and a pressure gauge configured to detect a pressure of the accumulator, wherein the pressure gauge automatically fills the accumulator with nitrogen supplied by the nitrogen supply unit in a nitrogen injection system by opening the pressure control valve and the electronic control valve such that the pressure of the accumulator filled with nitrogen is maintained at a set pressure when a pressure of the accumulator detected by the pressure gauge is equal to or lower than the set pressure, wherein when a loss-of-coolant accident (LOCA) occurs and external power is not supplied, the nitrogen filled in the accumulator is supplied to the inside of the seal housing by the pressure of the accumulator itself, the isolation valve being opened and the electronic control valve being closed when an LOCA occurs and external power is not supplied.

2. The passive nitrogen injection device of claim 1, wherein the accumulator is singly provided such that nitrogen is commonly supplied to the nuclear reactor coolant pump provided in plural number.

* * * * *